United States Patent
Naka

(10) Patent No.: US 10,214,027 B2
(45) Date of Patent: Feb. 26, 2019

(54) PORTABLE PRINTER

(71) Applicant: Brother Kogyo Kabushiki Kaisha, Nagoya-shi, Aichi-ken (JP)

(72) Inventor: Keishi Naka, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 15/718,329

(22) Filed: Sep. 28, 2017

(65) Prior Publication Data

US 2018/0086105 A1    Mar. 29, 2018

(30) Foreign Application Priority Data

Sep. 29, 2016 (JP) ................... 2016-191861

(51) Int. Cl.
  *B41J 3/44*     (2006.01)
  *B41J 2/355*    (2006.01)
  *B41J 3/36*     (2006.01)
  *B41J 29/393*   (2006.01)
  *G06F 3/12*     (2006.01)
  *B41J 29/02*    (2006.01)

(52) U.S. Cl.
  CPC .............. *B41J 3/44* (2013.01); *B41J 2/355* (2013.01); *B41J 3/36* (2013.01); *B41J 29/023* (2013.01); *B41J 29/393* (2013.01); *G06F 3/1206* (2013.01); *G06F 3/1236* (2013.01); *G06F 3/1244* (2013.01); *G06F 3/1291* (2013.01); *G06F 3/1292* (2013.01); *B41J 2029/3937* (2013.01)

(58) Field of Classification Search
  CPC ....... B41J 3/44; B41J 2/355; B41J 3/36; B41J 29/023; B41J 29/393; G06F 3/1206; G06F 3/1236; G06F 3/1244
  See application file for complete search history.

(56) References Cited

U.S. PATENT DOCUMENTS 8,149,431 B2 *  4/2012  Barton ................. G06F 3/1289
                                         358/1.1
8,620,216 B2 * 12/2013  Castrogiovanni ..... H04W 76/23
                                         455/41.2

FOREIGN PATENT DOCUMENTS

JP      2012-176559 A    9/2012

* cited by examiner

*Primary Examiner* — Lamson Nguyen
(74) *Attorney, Agent, or Firm* — Banner & Witcoff, Ltd.

(57) ABSTRACT

The disclosure discloses a portable printer including a feeder, a printing head, a controller, and a command transmission unit. The feeder is configured to feed a print-receiving medium. The printing head is configured to perform print on the print-receiving medium fed by the feeder. The controller is configured to control the feeder and the printing head in cooperation with each other to produce a first printed matter by using desired first print data. The command transmission unit is configured to transmit through wireless communication to another printer other than the portable printer a production instruction for a second printed matter having print contents equivalent to the first printed matter at a predetermined timing after start of production of the first printed matter.

10 Claims, 7 Drawing Sheets

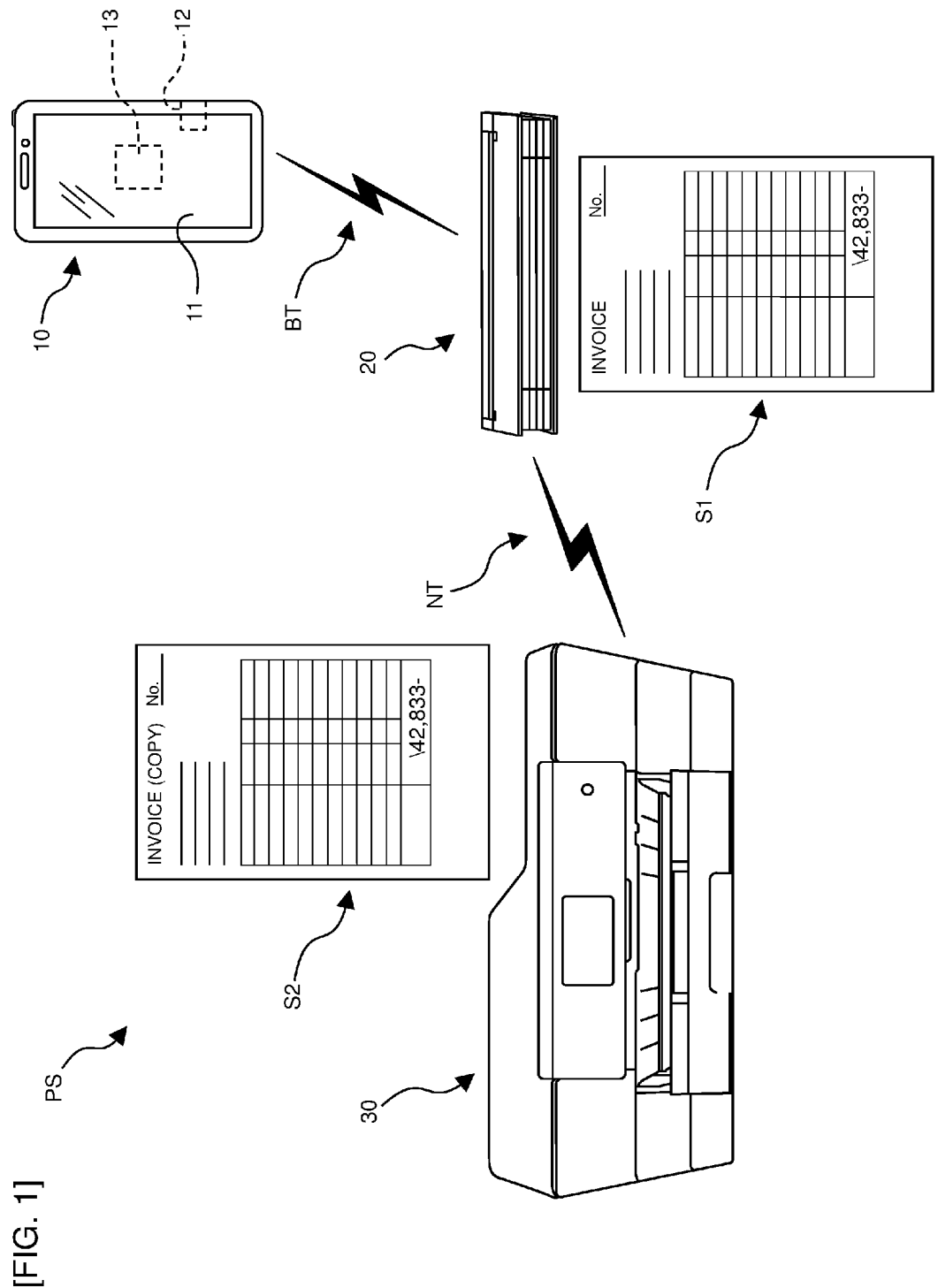

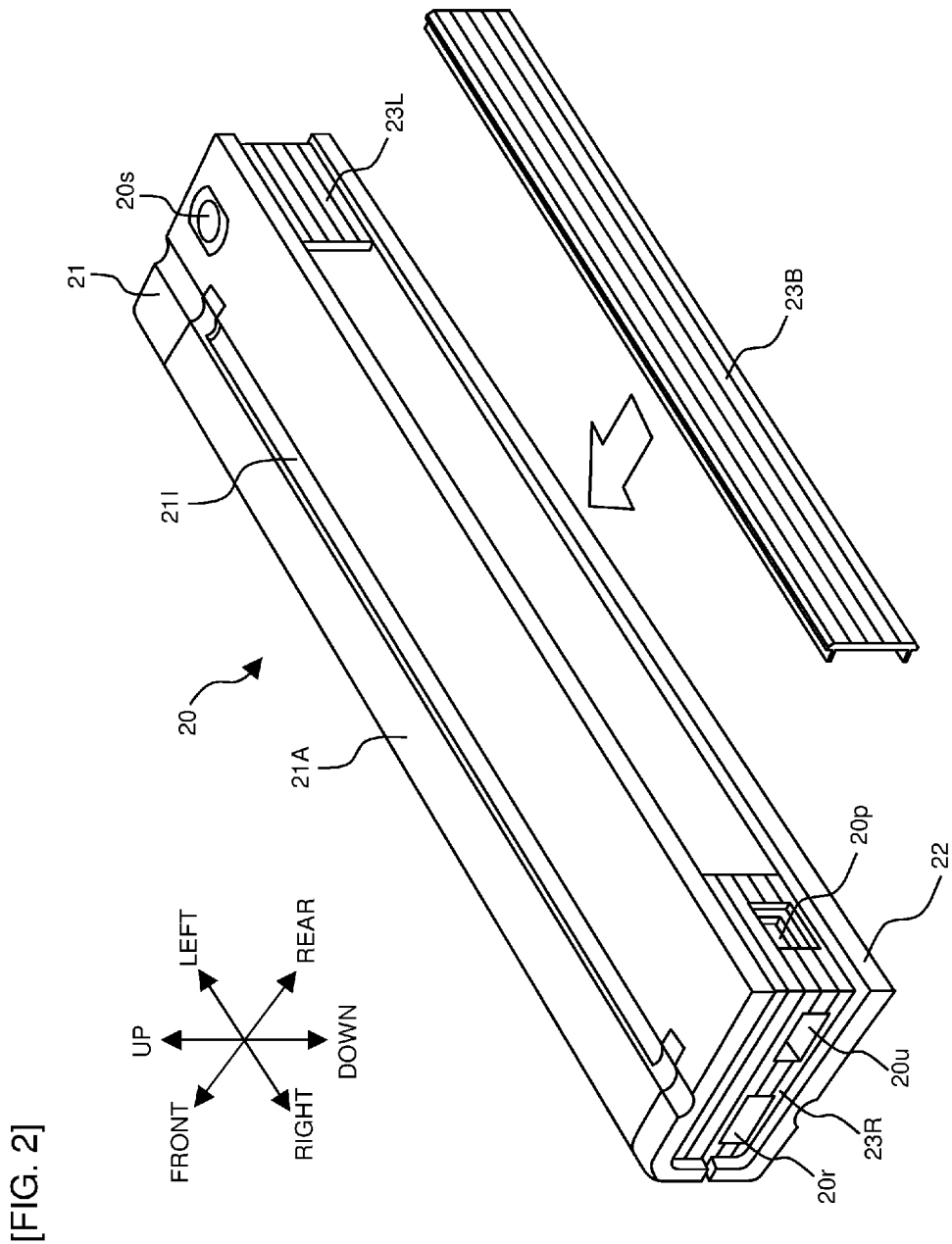
[FIG. 2]

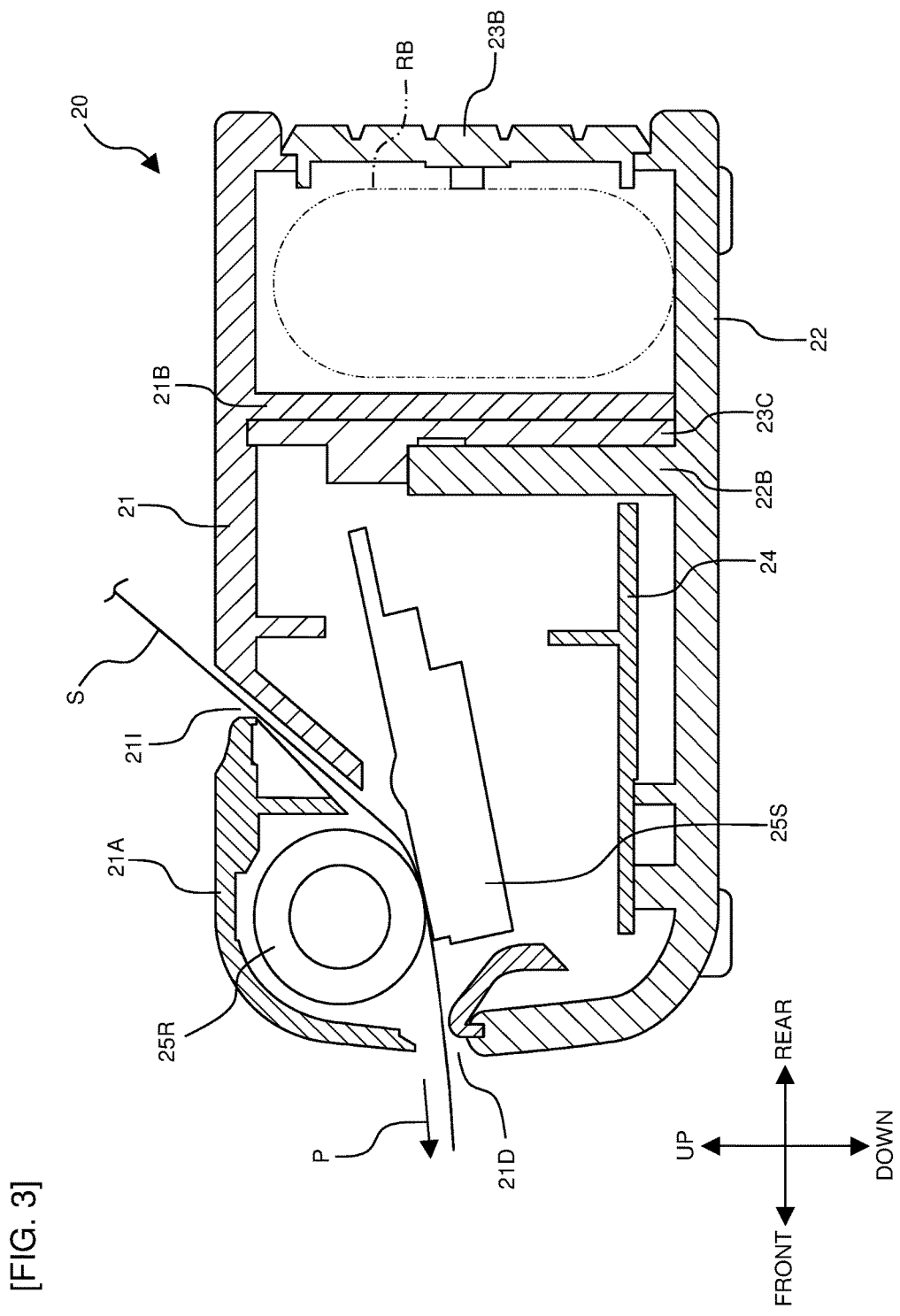
[FIG. 3]

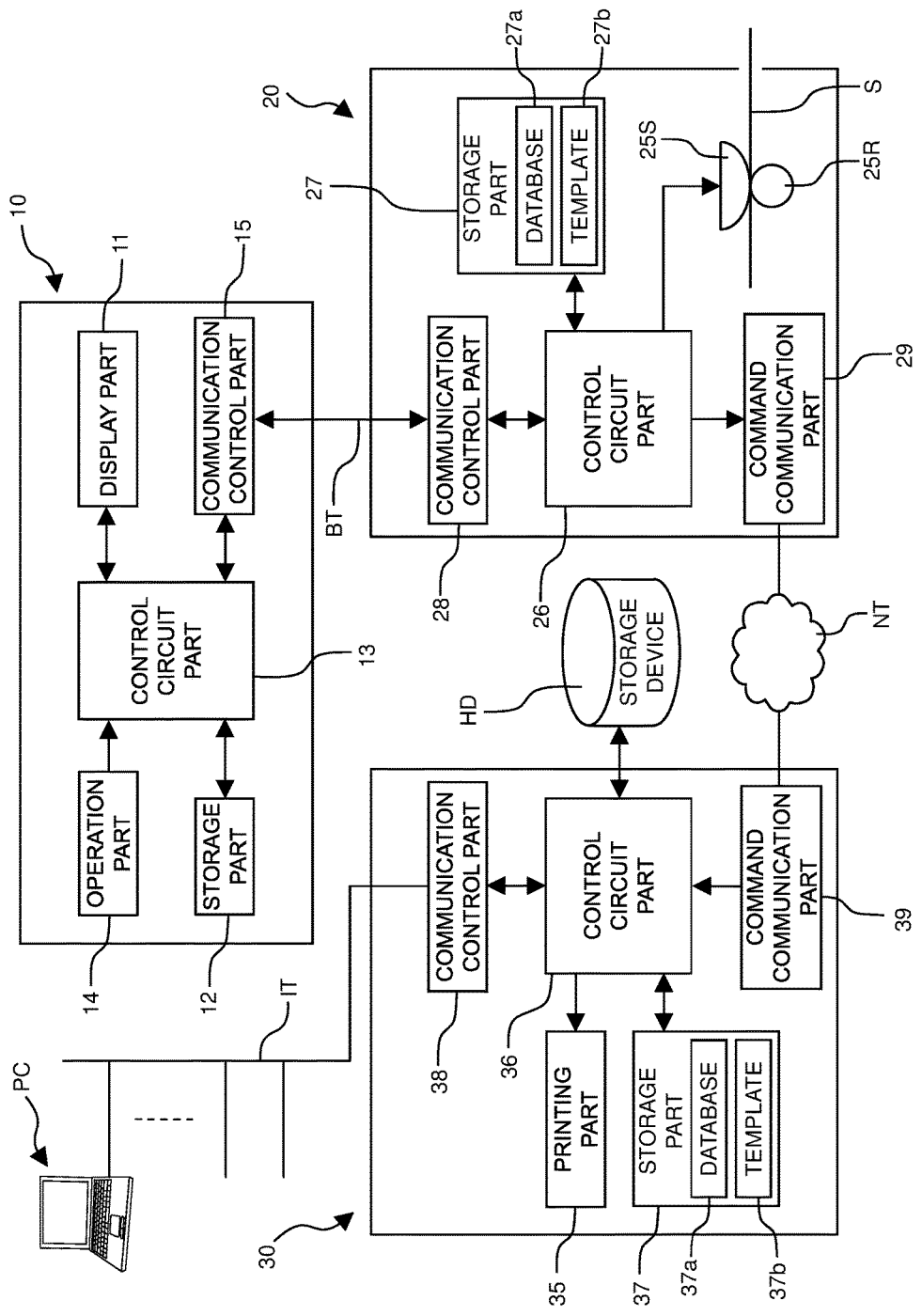
[FIG. 4]

[FIG. 5A]

| CUSTOMER NAME | ID | ADDRESS | TELEPHONE NUMBER | DISCOUNT RATE |
|---|---|---|---|---|
| BR CORPORATION | D004 | 4-18-3 △△, **-ku | 03-YYYY-XXXX | 0% |
| | | | | |
| | | | | |
| | | | | |

- 40
- 42 CUSTOMER NAME
- 43 ID
- 44 ADDRESS
- 45 TELEPHONE NUMBER
- 46 DISCOUNT RATE
- 41 (41a)
- 41 (41b)
- 41 (41n)

[FIG. 5B]

| PRODUCT NAME | PRODUCT CODE | UNIT PRICE |
|---|---|---|
| PRINTER (INKJET) | MFC-500D | 29,200 |
| INK | LC-4K | 5,230 |
| | | |
| | | |

- 50
- 52 PRODUCT NAME
- 53 PRODUCT CODE
- 54 UNIT PRICE
- 51 (51a)
- 51 (51b)
- 51 (51c)
- 51 (51n)

| INVOICE | | | | No. 16-1224 |
| --- | --- | --- | --- | --- |
| | | | | September 18, 2016 |

F1 — 4-18-3 ΔΔ, **-ku
F2 — 03-YYYY-XXXX
F3 — BR CORPORATION

Minato**Bld. 5th Floor
1-2-3 OO, Minato-ku, Tokyo
DT CORPORATION
TEL: 03 (0000) 0000
FAX: 03 (0000) 0001

F4  F5  F6  F7

| DESCRIPTION | UNIT PRICE | Qty | SUBTOTAL |
| --- | --- | --- | --- |
| PRINTER (MFC-500D) | 29,200 | 1 | 29,200 |
| INK (LC-4K) | 5,230 | 2 | 10,460 |
| | | | |
| | | | |
| | | | |
| | | | |
| | | | |
| TOTAL AMOUNT | | | 39,660 |
| TOTAL BILLING AMOUNT | | | ¥42,833- |

F8
F9

BANK FOR TRANSFER: B BANK, NAGOYA BRANCH
ACCOUNT HOLDER: DT CORPORATION
ACCOUNT NUMBER: 00-1234567

| INVOICE (COPY) | | | | No.16-1224 |
| --- | --- | --- | --- | --- |
| | | | | September 18, 2016 |

F1 — 4-18-3 ΔΔ, **-ku
F2 — 03-YYYY-XXXX
F3 — BR CORPORATION

F4  F5  F6  F7

| DESCRIPTION | UNIT PRICE | Qty | SUBTOTAL |
| --- | --- | --- | --- |
| PRINTER (MFC-500D) | 29,200 | 1 | 29,200 |
| INK (LC-4K) | 5,230 | 2 | 10,460 |
| | | | |
| | | | |
| | | | |
| | | | |
| | | | |
| TOTAL AMOUNT | | | 39,660 |
| TOTAL BILLING AMOUNT | | | ¥42,833- |

F8
F9

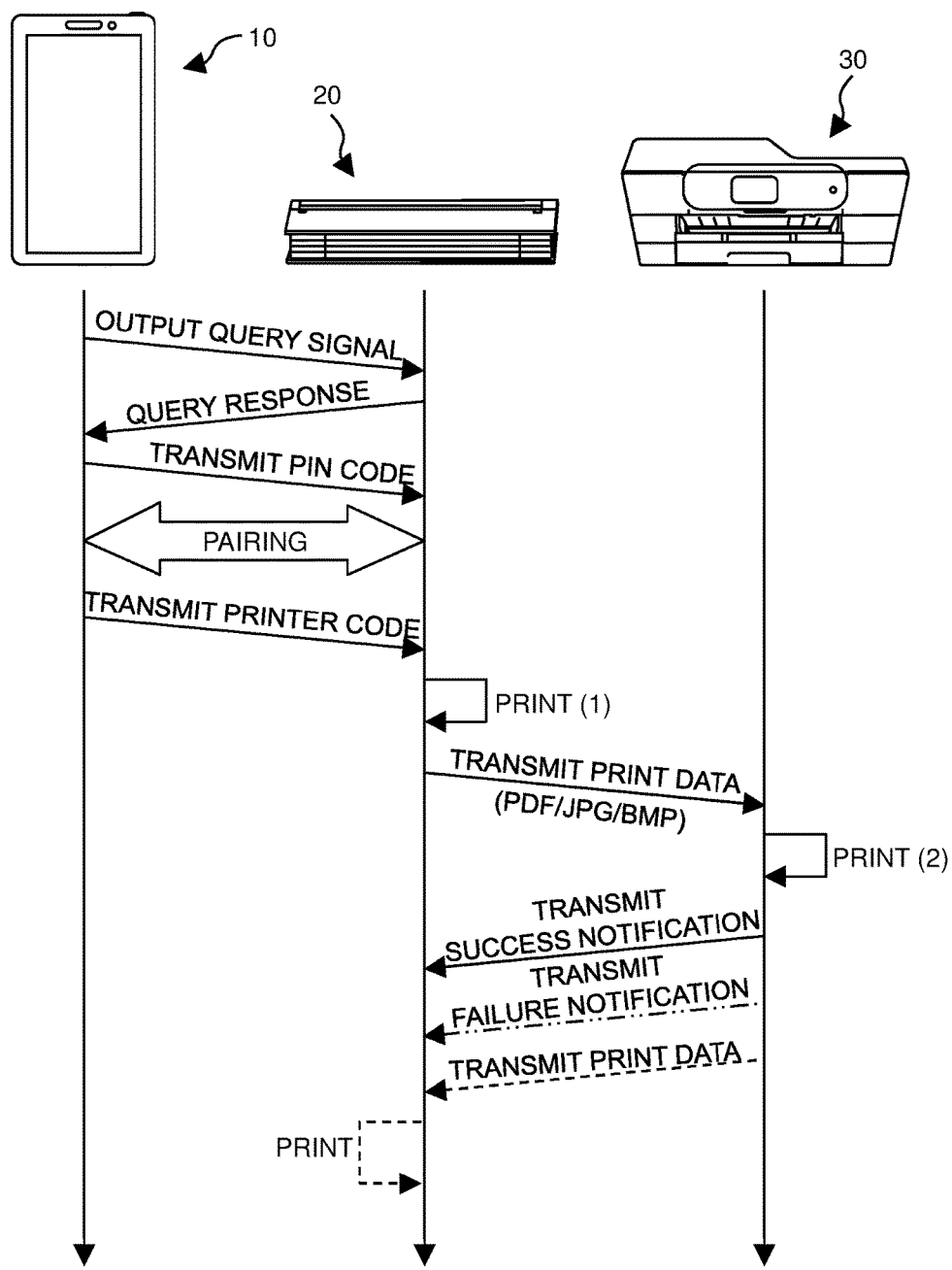
[FIG. 7]

PORTABLE PRINTER

CROSS-REFERENCE TO RELATED APPLICATION

The present application claims priority from Japanese Patent Application No. 2016-191861, which was filed on Sep. 29, 2016, the disclosure of which is incorporated herein by reference in its entirety.

BACKGROUND

Field

The present invention relates to a small portable printer having a simple configuration.

Description of the Related Art

A small portable printer having a simple configuration is known. By using such a portable printer, for example, materials etc. produced by a personal computer (notebook/desktop) can be printed. Furthermore, by installing a predetermined application in an information terminal such as a personal digital assistant (PDA) or a smartphone (a portable telephone having the function of PDA), materials produced by these information terminals can be printed by the portable printer as is the case with the personal computer.

Assuming that the portable printer of the prior art is used for, for example, managing in a storage place at least one of two printed matters considered as substantially identical or related prints, the one printed matter must be carried to the storage place, resulting in an increased labor burden. Even in the case of managing these printed matters as data, a storage work (copying of print data, etc.) is required for providing the print data produced in a place of visit after returning therefrom, causing problems of neglecting the storage work, occurrence of a time lag, etc.

Therefore, a conceivable technique for avoiding such a trouble is to simultaneously transmit print data having the same contents from an operation terminal to two printers for printing in respective places. However, even such a case causes a problem that even if print cannot be performed for some reason and an error occurs in one of the printers, the print is meaninglessly performed by the another printer. Also when the print data itself has a defect, a problem occurs because errors occur in two respective printers.

SUMMARY

It is an object of the present invention to provide a portable printer capable of improving convenience for an operator at the time of production of two printed matters considered as substantially identical or related prints.

In order to achieve the above-described object, according to an aspect, there is provided a portable printer comprising a feeder configured to feed a print-receiving medium, a printing head configured to perform print on the print-receiving medium fed by the feeder, a controller configured to control the feeder and the printing head in cooperation with each other to produce a first printed matter by using desired first print data, and a command transmission unit configured to transmit through wireless communication to another printer other than the portable printer a production instruction for a second printed matter having print contents equivalent to the first printed matter at a predetermined timing after start of production of the first printed matter.

BRIEF DESCRIPTION OF THE DRAWINGS

FIG. 1 is a system configuration diagram showing a configuration of a printing system according to an embodiment of the present invention.

FIG. 2 is a perspective view showing an outer contour configuration of a portable printer.

FIG. 3 is a cross-sectional view showing an internal configuration of the portable printer.

FIG. 4 is a block diagram showing functional configurations of an operation terminal, the portable printer, and a fixed printer.

FIG. 5A is an explanatory diagram of a template related to an example of mutually associated materials to be printed by a portable printer and a fixed printer when an invoice is produced as a business form.

FIG. 5B is an explanatory diagram of a template related to an example of mutually associated materials to be printed by a portable printer and a fixed printer when an invoice (copy) is produced as a business form.

FIG. 6A is an explanatory diagram of a template corresponding to an invoice related to a table type database.

FIG. 6B is an explanatory diagram of a template for producing an invoice (copy) as a business form related to a table type database.

FIG. 7 is an explanatory diagram of a sequence centering on the portable printer.

DETAILED DESCRIPTION OF THE PREFERRED EMBODIMENTS

An embodiment of the present invention will now be described with reference to the drawings. For convenience of description using upper, lower, left, right, front, and rear directions based on an example of a usage state, arrows indicative the directions are shown in FIGS. 2 and 3; however, the directions during use are not necessarily limited thereto and, for example, the front and rear as well as the left and right may be reversed when used.

In FIG. 1, the printing system PS includes an operation terminal 10 having a communication function, a portable printer 20 printing a first printed matter S1 with print data (first print data) based on a printer code transmitted from the operation terminal 10, and a fixed printer 30 as another printer printing a second printed matter S2 based on print data (second print data identical to the first print data) transmitted from the portable printer 20.

The operation terminal 10 and the portable printer 20 are arranged to be connected through a mutual recognition wireless communication line BT (hereinafter abbreviated as "BT connection" as needed) with connection authentication in the ad hoc communication, for example, Bluetooth (registered trademark), which is one of near-field wireless communication standards, such that information can be transmitted and received. Therefore, it is assumed in this description that the operation terminal 10 and the portable printer 20 at least have a communication function using communication in the ad hoc communication (in the following description, Bluetooth (registered trademark) standard). On the other hand, the portable printer 20 and fixed printer 30 are capable of interconnection by automatic recognition through a wireless communication line NT, for example, Internet of Things (IoT). The IoT can be IoT using a software development kit (SDK) providing support for easy and quick connection of hardware devices and mobile applications.

The operation terminal 10 is an information terminal such as a personal digital assistant (PDA) having a function corresponding to the BT communication and a smartphone (portable telephone having the function of PDA), for example. The operation terminal 10 includes a display part 11 employing a touch panel system made up of a color liquid crystal display, a storage part 12 made up of a storage circuit etc. storing an operating system (OS) for a computer, an application for implementing a function for the operation terminal 10 such as a call function, and an application for implementing a function related to the present invention, and a control circuit part 13 executing various functions based on the applications etc. stored in the storage part 12. In this example, the operation terminal 10 can transmit a printer code via the BT communication to the portable printer 20 and thereby cause the portable printer 20 to print desired print data. The printer code is a control code for causing the portable printer 20 to perform print with specified characters, formats, etc.

In FIG. 2, the portable printer 20 has a housing shape formed into a substantially rectangular parallelepiped as a whole including a pair of upper and lower cases 21 and 22 made of resin on the upper and lower sides as well as a pair of left and right decorative panels 23L and 23R on the left and right sides. The upper case 21 constitutes the upper half of the front side from an upper surface of the housing shape, while the lower case 22 constitutes the lower half of the front side from a lower surface of the housing shape, and the left and right decorative panels 23L, 23R are formed into symmetrical shapes, respectively constituting portions of a rear surface from left and right side surfaces of the housing shape. The upper case 21 opens in a cutout shape from near the center thereof toward the front surface and can be opened and closed by a cover member 21A having a substantially L-shaped cross section. The rear end edges of the left and right decorative panels 23L, 23R are separated from each other to form an opening, which can be opened and closed by a battery cover 23B. The upper case 21 is disposed with a power switch 20s, as well as various switches, information lamps, etc. as needed although not shown. The right decorative panel 23R opposite to the left side of the main body disposed with the power switch 20s has a connection connector 20p for a power adapter disposed on the rear side and, for example, a communication module 20r for infrared rays, a connection connector 20u for a USB cable, etc. disposed on the right side surface.

In FIG. 3, the portable printer 20 has interior portions closer to the front surface (left side of FIG. 3) and closer to the rear surface (right side of FIG. 3) isolated from each other by overlapping walls, i.e., a partition wall 21B vertically extending downward from the inner surface of the upper case 21, a partition wall 22B vertically extending upward from the inner surface of the lower case 22, and a partition wall 23C projecting laterally from at least one of the left and right decorative panels 23L, 23R. By coupling these overlapped partition walls 21B, 22B, 23B at least at two left and right positions by screws etc., the outer contour of the portable printer 20 is assembled. Therefore, preferably, the left decorative panel 23L and the right decorative panel 23R are formed into F shapes facing each other in a planar view such that the tip ends of the partition walls 23C abut against each other.

In the interior portion closer to the front surface of the portable printer 20, a printed wiring board 24 disposed on the lower side faces a feeding roller 25R and a thermal line head 25S disposed on the upper side. The cover member 21A covers the feeding roller 25R and the thermal line head 25S. At the time of print, a print-receiving medium S such as thermal recording paper is inserted into an insertion port 21I that is a gap between the vicinity of the opening edge of the upper case 21 and the upper edge of the cover member 21A, and the print-receiving medium S is discharged from a discharge port 21D that is a gap between the front edge of the lower case 22 and the lower edge of the cover member 21A.

A battery RB is disposed in the interior portion closer to the rear surface of the portable printer 20. The battery RB is a rechargeable battery such as a rod-shaped lithium battery that can be replaced by opening and closing the battery cover 23B.

Although not shown, the printed wiring board 24 is equipped with a control circuit made up of a CPU and a memory circuit as well as the various switches including the power switch 20s, the information lamps, and electronic circuit components such as the connection connector 20p, the communication module 20r, and the connection connector 20u described above, which are supplied with electric power from the battery RB or a power adapter connected to the connection connector 20p. The battery RB can be charged by connecting the power adapter to the connection connector 20p.

The feeding roller 25R is rotatably supported inside the portable printer 20 and feeds the print-receiving medium S along the transport direction in accordance with power transmission from a drive mechanism (not shown) using the electric power supplied from the battery RB as a driving source. The thermal line head 25S is disposed to freely come into contact with and separate from the feeding roller 25R and, at the time of print, comes into contact with the feeding roller 25 with a predetermined contact pressure to perform a desired print on the print-receiving medium S inserted therebetween.

Normally, by inserting the print-receiving medium S into a transport path extending from the insert port 21I to the discharge port 21D while the cover member 21A is closed, the print-receiving medium S is fed by the feeding roller 25R and the desired print is performed onto the print-receiving medium S by the thermal line head 25S.

Although the fixed printer 30 serving as the another printer may be the same printer as the portable printer 20, the printer used in the following description is a general-purpose IoT-ready inkjet network printer capable of connection through the Internet. However, the printing system and the communication system are not limited as long as communication with the portable printer 20 can wirelessly be achieved. Therefore, the fixed printer 30 can be the same printer as the portable printer 20 or a general-purpose printer and will not be described in terms of the outer contour, the internal configuration, etc.

The functional configurations of the operation terminal 10, the portable printer 20, and the fixed printer 30 in the printing system PS will be described with reference to FIG. 4.

In FIG. 4, the operation terminal 10 is an information terminal having a BT communication function. The operation terminal 10 includes, in addition to the display part 11, the control circuit part 13, and the storage part 12 described above, an operation part 14 including a touch panel part etc. of the display part 11, and a communication control part 15 connecting to the portable printer 20 such that information can be transmitted and received through the BT communication with connection authentication in the ad hoc communication, separately from the communication function of a portable telephone for a call, the Internet, etc.

The control circuit part 13 is, for example, a control circuit such as a CPU and has a computer function in combination with the storage part 12 made up of a RAM, a ROM, etc. Therefore, the control circuit part 13 executes signal processing in accordance with a program stored in advance in the ROM while using a temporary storage function of the RAM, thereby transmitting and receiving various instruction/information signals to and from the portable printer 20.

For example, the storage part 12 can be used together with a card type (chip-shaped) storage medium removably attached to the operation terminal 10. As a result, the storage part 12 can store a program for converting the print instruction into a printer code (described in detail later) and a pairing program (described in detail later) for each of predetermined formats such as character styles and fonts accompanying an application installed in advance.

In addition to the feeding roller 25R and the thermal line head 25S performing a desired print on the print-receiving medium S described above, the portable printer 20 includes a control circuit part 26, a storage part 27 made up of, for example, a RAM and a ROM, a communication control part 28 controlling the BT communication performed with the operation terminal 10, and a command communication part 29 controlling the wireless communication performed with the fixed printer 30. In FIG. 4, the power switch 20s, the various switches and information lamps, the connection connector 20p, the communication module 20r, and the connection connector 20u of the portable printer 20 are not shown. It is noted that the communication module 20r is, for example, a module for infrared rays, or may be a module having the functions of the communication control part 28 and the command communication part 29. In other words, the communication control part 28 and the command communication section 29 are distinguished from each other since wireless communication forms of different standards are used because of a difference in function.

The storage part 27 includes areas storing a database and a template for developing into a document in a fixed format (business form) based on print data produced by the operation terminal 10, for example. When receiving a printer code from the operation terminal 10 via the communication control part 28, the control circuit part 26 analyzes the control code to control execution of print etc.

The fixed printer 30 can be achieved by using the portable printer 20 or a general-purpose printer, and includes a printing part 35, a control circuit part 36, a storage part 37, a communication control part 38, and a command communication part 39 corresponding to the printing method (thermal, inkjet, laser, etc.) thereof. Therefore, the communication control part 38 does not directly receive the printer code from the operation terminal 10. Thus, for example, print data can be received from a personal computer PC connected to an in-house network line IT such as an intranet and can be printed by the printing part 35. The functions of the other parts, i.e., the control circuit part 36, the storage part 37, and the command communication part 39, are implemented as functions at least identical to the functions executed by the control circuit part 26, the storage part 27, and the command communication part 29 in the portable printer 20. However, for the purpose of managing in a storage place at least one of two printed matters considered as substantially identical or related prints, the fixed printer 30 is connected to a mass storage device HD such as a hard disk drive (HDD) separated from the storage part 37 and uses the storage device HD as a storage place of data. The data in this case may be the print data itself (including the printer code), or may be image data (e.g., PDF, JPG, BMP) converted from a printed matter printed by the fixed printer 30. The print data transmitted by the portable printer 20 via the wireless communication line NT to the fixed printer 30 may also be data converted to image data (e.g., PDF, JPG, BMP).

The first printed matter S1 and the second printed matter S2 shown in FIG. 1 are printed matters associated with databases stored in database storage areas 27a, 37a and templates stored in template storage areas 27b, 37b of the storage part 27 and the storage part 37. The second printer matter S2 printed by the fixed printer 30 is not completely identical to the first printed matter S1 printed by the portable printer 20 and can be a "substantially identical" printed matter.

"Substantially identical" means such a case that, for example, as shown in FIG. 1, the first printed matter S1 printed by the portable printer 20 is used as "INVOICE" while the second printed matter S2 printed by the fixed printer 30 is used as "INVOICE (COPY)". Therefore, "substantially identical" includes the case that, for example, the print of the address etc. of one's own company and the destination of money transfer is unnecessary and therefore is not performed because the second printer matter S2 is used as "INVOICE (COPY)". In other words, "substantially identical" includes the case that printed matters used as business forms such as slips share principal contents, for example, carbon copy information such as slip contents related to purchased products in accordance with the purpose thereof, while the other pieces of information are partially eliminated (or added) on either of the printed matters.

As a result, one can issue an invoice printed as the first printed matter by the portable printer 20 to a customer on a customer's site that is a place of visit, and can cause the fixed printer 30 to print an invoice (copy) as the second printed matter S2 at a predetermined timing while being in the place of visit (or while moving), for example.

"In accordance with the purpose" covers the case that business form titles such as slip titles match. In particular, a business form title to be printed is fixed for each template described later and is simply a slip selection item (template selection item), rather than an item entered as characters such as "invoice" by an operator using the operation terminal 10. Therefore, this is not included in the concept of "substantially identical" described above.

"Substantially identical" can include printed matters having information partially changed because the purpose is different. For example, the first printed matter S1 is used a statement of delivery while the second printed matter S2 is used an invoice in some cases. In such a case, for example, although the issue date of the statement of delivery is the delivery date (today), the invoice may be issued on a data different from the delivery date because of the customer's cutoff date or payment date. In such a case, the issue dates of the slips may become different from each other because the cutoff date is used as the issue date of the invoice although the portion of the slip contents (carbon copy information) is the same. Additionally, when the business forms are slips, the printed matters different in purpose include a slip given to a customer and a slip kept at hand for storage/management as in the case of a quotation, a statement of delivery, an invoice, and copies thereof as needed. Therefore, the "substantially identical" printed matters correspond to a quotation and a quotation (copy), a statement of delivery and a statement of delivery (copy), an invoice and an invoice (copy), etc. The printed matters related to each other included in the concept of "substantially identical" regardless of being different in print contents due to difference of purpose can cover one or more combinations of quotations, statements of delivery, invoices, and copies thereof, as needed. When these slips are objects to be printed, differences in some print contents such as the issue date depend on a situation (customer etc.). The related printed matters are not limited to a one-to-one relation between the print by the portable printer 20 and the print by the fixed printer 30 as in the case of using the first printed matter S1 as "statement of delivery" and the second printed matter S2 as "invoice", for example. For example, as in the case of using the first printed matter S1 as "statement of delivery" and the second printed matter S2 as "invoice" and "invoice (copy)", the case of one-to-two (-many) relation between the print by the portable printer 20 and the print by the fixed printer 30 can be included.

In such a relationship, if a statement of delivery is output by the portable printer 20 and an invoice is output by the fixed printer 30, differences may be generated as compared to the relation between an invoice and an invoice (copy); however, this can deal with such a utilization form as printing in-house for sending the invoice by mail and eliminating the issuance of the invoice (copy). Therefore, in the case of such a utilization form, if the statement of delivery is directly printed as the first printed matter S1 by using the portable printer 20 at a place of visit, the portable printer 20 may cause the fixed printer 30 to print two printed matters "invoice" and "invoice (copy)" as the second printed matter S2.

<Database 40>

FIG. 5 shows an example of databases 40, 50. FIG. 5A shows the database 40, for example, when customer information developed in a destination field at the time of issuing an invoice as the first printed matter S1 is stored as a table in the database storage area 27a of the storage part 27 and the database storage area 37a of the storage part 37. The database 40 has a data group included in each row shown in FIG. 5A as a record 41, and each record can include basic information such as a customer name field 42 having a customer name, an ID field 43 having an assigned character string indicative of an ID assigned to each customer, an address field 44 having an address, and a telephone number field 45 having a telephone number, as well as one or more appropriate information fields of, for example, a discount rate and a cutoff date for issuance of an invoice, for each customer as needed (a discount rate field 46 of FIG. 5A). The order of these fields is not limited and, for example, the ID field 43 and the customer name field 42 may be in reverse order. In the following description, the records 41 include records from a record 41a on a first row, a record 41b on a second row, etc. to a record 41n on an n-th row, which are collectively referred to as the record 41.

The record 41a on the first row of the database 40 has "BR CORPORATION" assigned as a character string representative of a customer name in the customer name field 42, "D004" assigned as a character string representative of an ID in the ID field 43, "4-18-3 ∆∆, ○○ ward" assigned as a character string representative of an address in the address field 44, "03-YYYY-XXXX" assigned as a character string representative of a telephone number in the telephone number field 45, and "0%" assigned as a character string representative of a discount rate in the discount rate field 46. Also in the subsequent fields from the record 41b on the second row, character strings are similarly input in advance in each of the records 41. Information of each of these records 41 can automatically be developed in the destination field for the billing destination of the invoice by entering the ID on the operation terminal 10, for example.

FIG. 5B shows the database 50, for example, when product information developed in a slip field at the time of issuance of an invoice as the first printed matter S1 is stored as a table in the database storage area 27a of the storage part 27 and the database storage area 37a of the storage part 37. The database 50 has a data group included in each row shown in FIG. 5B as a record 51, and each record includes basic information such as a product name field 52 having a product name, a product code field 53 having an assigned character string indicative of a code assigned to each product, and a unit price field 54 having a selling price (a list price in this case) of each product. Also in this database 50, one or more appropriate information fields (not shown) can be included as needed. The order of these fields is not limited and, for example, the product code field 53 and the product name field 52 may be in reverse order. In the following description, the records 51 include records from a record 51a on the first row, the record 51b on the second row, etc. to a record 51n on the n-th row, which are collectively referred to as the record 51.

The record 51a on the first row of the database 50 has "PRINTER (INKJET)" assigned as a character string representative of a product name in the product name field 52, "MFC-500D" assigned as a character string representative of a product code in the product code field 53, and "29200" assigned as a character string representative of a product unit price in the unit price field 54. The record 51b on the second row has "INK" assigned as a character string representative of a product name in the product name field 52, "LC-4K" assigned as a character string representative of a product code in the product code field 53, and "5230" assigned as a character string representative of a product unit price in the unit price field 54. Also in the subsequent fields from the record 51c on the third row, character strings are similarly input in advance in each of the records 51.

The storage part 27 and the storage part 37 store templates for laying out at least one character string (multiple character strings in an example described later) respectively allocated to a plurality of fields F1 to F5 in a predetermined manner in the records 41 of the database 40 and the records 51 of the database 50 stored in the database storage regions 27a, 37a. For example, templates sent from an application including templates installed in the storage part 12 of the operation terminal 10 are stored in advance in the template storage area 27b. Templates stored in the storage device HD are stored in advance in the template storage area 37b. In the following description, the first printed matter S1 shown in FIG. 6A is substituted for a template T1 (hereinafter also referred to as a "first template T1") and the second printed matter S2 shown in FIG. 6B is substituted for a template T2 (hereinafter also referred to as a "second template T2").

<Template>

The template T1 in this case is a business form in which character strings respectively allocated to a plurality of fields corresponding to the records of the database 40 stored in the database storage area 27a of the storage part 27 can be laid out in a predetermined manner. The template T2 is a business form in which character strings respectively allocated to a plurality of fields corresponding to the records of the database 40 stored in the database storage area 37a of the storage part 37 can be laid out in a predetermined manner and the business form has contents substantially identical to the template T1 in accordance with the purpose thereof.

As shown in FIG. 6A, in the template T1, for example, the invoice issue number is automatically assigned by the application of operation terminal 10. To the template T1, fixed information is assigned as character information indicative of the purpose of "INVOICE", ruled line information for a frame of the slip field, and character information indicative of items such as "DESCRIPTION", "UNIT PRICE", "QUANTITY", "SUBTOTAL", "TOTAL AMOUNT", and "TOTAL BILLING AMOUNT", as well as character information serving as biller address information and transfer destination information. Additionally, the destination field for a billing destination has a field F3 corresponding to the customer name field 42, a field F1 corresponding to the address field 44, and a field F2 corresponding to the telephone number field 45 laid out in a predetermined manner. The slip field of the template T1 has a description field F4 corresponding to the product name field 52 and the product code field 53 of the database 50, and a unit price field F5 corresponding to the unit price field 54 laid out in each row. Additionally, the slip field of the template T1 has a quantity field F6 in which a numerical value is individually input by operation of the operation terminal 10, a subtotal field F7 in which a subtotal amount obtained by multiplication between the quantity input in the quantity field F6 and the unit price field F5 is calculated and input, a total amount field F8 in which amounts in the subtotal field F7 are summed, and a total billing amount field F9 in which the amount of tax such as consumption tax is added to the amount of the total amount field F8, laid out therein. These amounts are calculated by the control circuit part 26. The unit price assigned to the unit price field F5 may be a price discounted by the discount rate of the discount rate field 46 from the unit price of the unit price field 54, or can be handled in an appropriate manner such as discounting the total billing amount. In the following description, the fixed information including a ruled line frame laid out in a predetermined manner such as the fields F1 to F9 in the template T1 for the first printed matter S1 is also referred to as a "first print object". The numbers etc. assigned to the fields F1 to F9 are also referred to simply as "character strings".

As shown in FIG. 6B, in the template T2, for example, the invoice issue number is transferred from the portable printer 20 and automatically assigned by the application of operation terminal 10. To the template T2, fixed information is assigned as character information indicative of the purpose of "INVOICE (COPY)", ruled line information for a frame of the slip field, and character information indicative of items such as "DESCRIPTION", "UNIT PRICE", "QUANTITY", "SUBTOTAL", "TOTAL AMOUNT", and "TOTAL BILLING AMOUNT". Additionally, as is the case with the template T1, the destination field for a billing destination has the field F3 corresponding to the customer name field 42, the field F1 corresponding to the address field 44, and the field F2 corresponding to the telephone number field 45 laid out in a predetermined manner. The slip field of the template T2 has the description field F4 corresponding to the product name field 52 and the product code field 53 of the database 50, and the unit price field F5 corresponding to the unit price field 54 laid out in each row. Additionally, the slip field of the template T2 has the quantity field F6 in which a numerical value is individually input by operation of the operation terminal 10, the subtotal field F7 in which a subtotal amount obtained by multiplication between the quantity input in the quantity field F6 and the unit price field F5 is calculated and input, the total amount field F8 in which amounts in the subtotal field F7 are summed, and the total billing amount field F9 in which the amount of tax such as consumption tax is added to the amount of the total amount field F8, laid out therein. These amounts are calculated by the control circuit part 26. The unit price assigned to the unit price field F5 may be a price discounted by the discount rate of the discount rate field 46 from the unit price of the unit price field 54, or can be handled in an appropriate manner such as discounting the total billing amount. In the following description, the fixed information including a ruled line frame laid out in a predetermined manner such as the fields F1 to F9 in the template T2 for the second printed matter S2 is also referred to as a "second print object". The numbers etc. assigned to the fields F1 to F9 are also referred to simply as "character strings".

As a result, the first printed matter S1 serving as an invoice shown in FIG. 6A has "BR CORPORATION" as the character string representative of a customer name in the customer name field 42, "4-18-3 ∆∆, ○○ ward" as the character string representative of an address in the address field 44, and "03-YYYY-XXXX" as the character string representative of a telephone number in the telephone number field 45 developed to the respective fields F1 to F3 in the destination field described above. Similarly, the first printed matter S1 has "PRINTER (MFC-500D)" as the character string corresponding to the product name field 52 and the product code field 53, and "29,200" as the character string corresponding to the unit price field 54 laid out in the fields F4 to F5 on the first row of the slip field. Additionally, the first template T1 has "1" individually input as a numerical value by the operation of the operation terminal 10 and a numerical value "29,200" as the subtotal amount from multiplication, which are automatically input to the fields F6 to F7 on the first row of the slip field. Similarly, the first printed matter S1 has "INK (LC-4K)" as the character string corresponding to the product name field 52 and the product code field 53, and "5,230" as the character string corresponding to the unit price field 54 laid out in the fields F4 to F5 on the second row of the slip field. Additionally, the first template T1 has "2" individually input as a numerical value by the operation of the operation terminal 10 and a numerical value "10,460" as the subtotal amount from multiplication, which are automatically input to the fields F6 to F7 on the first row of the slip field. Furthermore, the total amount "39,600" and the total billing amount "¥42,833-" are automatically input to the fields F8 and F9, respectively, of the slip field. Field F9 is laid out. These amounts are calculated by the control circuit part 26.

It is noted that the technique of using the template T1 may be achieved without using the database 40 and, for example, after calling and displaying the template T1 from the storage part 27 built in the portable printer 20 onto the display part 11 of the operation terminal 10, characters may manually be input by a predetermined operation of the operation part 14 and, when all the fields F1 to F6 except automatic calculation are filled, print can be executed by operating the operation part 14.

On the other hand, the second printed matter S2 serving as an invoice (copy) shown in FIG. 6B has "BR CORPORATION" as the character string representative of a customer name in the customer name field 42, "4-18-3 ∆∆, ○○ ward" as the character string representative of an address in the address field 44, and "03-YYYY-XXXX" as the character string representative of a telephone number in the telephone number field 55 developed to the respective fields F1 to F3 in the destination field. In the slip field of the second printed matter S2, the characters (including numbers) used in the fields F3 to F9 of the first printed matter S1 are directly transmitted as print data and laid out without performing the calculations etc. described above. For the template T2, the template T1 completely identical to that of the portable printer 20 may be used in some cases.

<Characteristics of Present Embodiment>

As described above, the portable printer 20 has the feeding roller 25R for feeding the print-receiving medium S and the thermal line head 25S performing print onto the print-receiving medium S fed by the feeding roller 25R so as to produce the first printed matter S1 by using the desired first print data through cooperation between the feeding roller 25R and the thermal line head 25S, and has the command communication part 29 transmitting through the wireless communication line NT to the fixed printer 30 different from the portable printer 20 a production instruction for the second printed matter S2 having the print contents equivalent to the first printed matter S1 at a predetermined timing after start of the production of the first printed matter S1.

The portable printer 20 produces the corresponding first printed matter S1 by using the desired print data (first print data) through cooperation between the feeding roller 25R and the thermal line head 25S. In this case, after start of the production of the first printed matter S1, the command communication part 29 outputs to the fixed printer 30 the production instruction for producing the second printed matter S2 having the print contents equivalent to the first printed matter S1, at a predetermined timing (e.g., after completion of the production of the first printed matter S1 or after completion of the production of a main portion of the first printed matter S1). As a result, the fixed printer 30 receiving the production instruction produces the second printed matter S2 having the description contents substantially identical to the first printed matter S1.

The portable printer 20 further has the template storage area 27b storing the template (first template) T1 in which the first print object is laid out in a predetermined manner with the character strings assigned to the first print object.

Furthermore, the command communication part 29 may output to the fixed printer 30 a production instruction including image data (such as PDF, JPG, BMP) of the first printed matter S1, or only the print data converted to calculated numbers.

In such a system configuration, the operation terminal 10 and the portable printer 20 are capable of mutually authenticated connection through an automatic pairing function. A routine from this automatic pairing to the print of the second printed matter S2 will hereinafter be described as a sequence with reference to FIG. 7.

<Outline of Pairing>

At the time of printing by the portable printer 20, the operator operates the application activated in the operation terminal 10 to enter print data etc. to be printed on a surface of the print-receiving medium S and to input a print start instruction. As a result, the operation terminal 10 transmits a printer code corresponding to the print data through the BT communication to the portable printer 20 and causes the thermal line head 25S to perform print based on the print data.

In this case, the portable printer 20 has a predefined PIN code functioning as a confirmation identifier (passcode) for connection authentication for permitting the operation of the portable printer 20. The portable printer 20 authenticates the operation terminal 10 as an operating entity only when receiving the PIN code corresponding to the portable printer 20 from the operation terminal 10 through the BT communication (=pairing between the operation terminal 10 and the portable printer 20). This enables the portable printer 20 to subsequently perform the print corresponding to the printer code transmitted from the operation terminal 10. Therefore, to allow the portable printer 20 to perform the print corresponding to the print data from the operation terminal 10 in this way, the pairing must be completed in advance.

<Correlation between PIN Code and Device ID>

The portable printer 20 has a device ID (model number) that is unique identification information preliminarily correlated with the PIN code in accordance with a predetermined rule. This device ID is stored in storage part 27. For example, the PIN code is a four-digit number. The device ID is set to include the same numeric value as the PIN code after six characters including alphabetical characters followed by a hyphen.

<Execution of Automatic Pairing>

Therefore, when the operator inputs the print start instruction, the operation terminal 10 transmits the printer code corresponding to a pairing instruction (described later) to the portable printer 20 through the BT communication to search for a printer having the BT communication function (specifically, to output a query signal; see "output query signal" of FIG. 7). When the operation terminal 10 finds the portable printer 20 in this way, the control circuit part 26 of the portable printer 20 outputs the device ID stored in the storage part 27 in response via the communication control part 28 to the operation terminal 10 (see "query response" of FIG. 7). As a result, the control circuit part 13 of the operation terminal 10 inputs the device ID of the portable printer 20 via the communication control part 15 and acquires the device ID.

The device ID acquired by the operation terminal 10 from the portable printer 20 in this way includes the same information as the PIN code at the end as described above. Therefore, when acquiring the device ID of the one portable printer 20, the operation terminal 10 can automatically acquire the PIN code of the portable printer 20 by extracting the last four digits included in the device ID. The operation terminal 10 then transmits the acquired PIN code through the BT communication to the portable printer 20 (see "transmit PIN code" of FIG. 7). As a result, the portable printer 20 receiving the PIN code can authenticate the transmission source, i.e., the operation terminal 10, as an authorized operating entity, and the pairing between the operation terminal 10 and the portable printer 20 is completed (See "pairing" of FIG. 7).

To execute the automatic pairing function, a pairing program is stored in the storage part 12 of the operation terminal 10. This pairing program is a program for transmitting a pairing instruction so as to complete the pairing between the operation terminal 10 and the portable printer 20 by searching for the portable printer 20 having the BT communication function, acquiring the device ID unique to the device for the found portable printer 20, generating the PIN code from the acquired device ID, and transmitting the generated PIN code.

When receiving the printer code from the operation terminal 10 in association with completion of this pairing (see "transmit printer code" of FIG. 7), the portable printer 20 uses the corresponding template T1 and the database 40 to print the first printed matter S1 (see "print (1)" of FIG. 7). If some kind of error (e.g., jam) has occurred during this print, the portable printer 20 performs existing error control.

When this print is completed, the portable printer 20 transmits print data to the fixed printer 30 (see "transmit print data" of FIG. 7). This print data is different from the print data (first print data) received by the portable printer 20 from the operation and is the second print data directly received from the portable printer 20 via the wireless communication line NT and may be image date etc.

As a result, the portable printer 20 causes the fixed printer 30 to print the second printed matter S2 (see "print (2)" of FIG. 7).

Subsequently, when the print is properly completed by the fixed printer 30, the portable printer 20 receives a success notification (see "transmit success notification" of FIG. 7). If some kind of error (e.g., jam) has occurred during the print, the portable printer 20 receives a failure notification when an error has occurred in the fixed printer 30 (see "transmit failure notification" of FIG. 7).

If the print has failed in the fixed printer 30, the portable printer 20 may receive the print data from the fixed printer 30 to print the second printed matter S2 by the portable printer 20 ("transmit print data" and "print" of FIG. 7).

The command communication part 29 of the portable printer 20 may output the production instruction for the second printed matter S2 including the second print data identical to the first print data to the fixed printer 30.

The command communication part 29 of the portable printer 20 desirably transmits the production instruction to the fixed printer 30 when the production of the first printed matter S1 is completed through cooperation between the feeding roller 25R and the thermal line head 25S. After the production of the first printed matter S1 is completely terminated, transmission to the production instruction to the fixed printer 30 is performed.

The portable printer 20 can store the address information (e.g., IP address) of the fixed printer 30 registered in advance in the storage part 27 so as to transmit the production instruction from the command communication part 29 based on the address information to the fixed printer 30.

Furthermore, if the command communication part 29 of the portable printer 20 transmits the production instruction to the fixed printer 30 and a production failure notification of the second printed matter S2 based on the production instruction is then received from the fixed printer 30, an error report can be made.

After making such a report, or by using the reception of the production failure notification as a trigger, the control circuit part 26 of the portable printer 20 may control the feeding roller 25R and the thermal line head 25S by using the second print data to produce the second printed matter S2. Since the miniaturization is basically prioritized, the portable printer 20 often has no stock of the print-receiving medium S and, therefore, after the operator inserts and sets the print-receiving medium S in accordance with the report, the portable printer 20 can automatically take over and perform the production of the second printed matter S2 (instead of the fixed printer 30) when the production of the second printed matter S2 to be produced as a copy of the first printed matter S1 has failed for some reason on the side of the fixed printer 30, for example.

In typical printers, print data is automatically deleted when print is completed. Therefore, when the print by the fixed printer 30 has failed, the print data is acquired from the fixed printer 30 holding the print data in the description of the embodiment. However, since the second printed matter S2 is printed through the wireless communication line NT from a remote location, the print data may not be erased until reception of a success notification of proper print performed by the fixed printer 30, and reception of a failure notice may be followed by print of the second printed matter S2 using the first print data.

The present invention is not limited to the embodiment and can variously be modified without departing from the spirit and the technical ideas thereof. For example, the portable printer 20 is not limited to the thermal printer described above and is not particularly limited as long as the printer is one of those having portability like an ink ribbon system etc. Additionally, the communication standard according to the ad hoc communication system of the operation terminal 10 and the portable printer 20 as well as the wireless communication system of the portable printer 20 and the fixed printer 30 are not limited to the above description.

In the above description, with regard to the appearance dimensions, sizes (ratios), etc. of the portable printer 20 and the fixed printer 30 shown in FIG. 1 etc., the state shown in the figures does not necessarily correspond to the actual state.

In the above description, the arrows shown in the block diagram of FIG. 4 show an example of the signal flow, including the flow direction etc. of signals for executing the existing functions of the operation terminal 10, the portable printer 20, and the fixed printer 30, and are not limited to the state shown in the figure.

The sequence diagram shown in FIG. 7 does not limit the procedures of the present invention, and the procedures may be added/deleted or may have the order changed without departing from the spirit and the technical ideas of the invention. For example, a time difference may not necessarily exist in terms of timing of communications between the operation terminal 10 and the portable printer 20 and between the portable printer 20 and the fixed printer 30. Although not described or illustrated, the sequence diagram of FIG. 6 may include a feedback signal, an error signal, etc. appropriately transmitted for acknowledgment in response to a signal transmitted from one side.

The techniques of the embodiment and modification examples may appropriately be utilized in combination other than those described above.

Although not exemplarily illustrated one by one, the present invention is implemented with other various modifications without departing from the spirit thereof.

What is claimed is:

1. A portable printer comprising:
   a feeder configured to feed a print-receiving medium;
   a printing head configured to perform print on said print-receiving medium fed by said feeder;
   a controller configured to control said feeder and said printing head in cooperation with each other to produce a first printed matter by using desired first print data; and
   a command transmission unit configured to transmit through wireless communication to another printer other than said portable printer a production instruction for a second printed matter having print contents equivalent to the first printed matter at a predetermined timing after start of production of said first printed matter.

2. The portable printer according to claim 1, wherein said command transmission unit is configured to output to said another printer the production instruction for said second printed matter including second print data identical to said first print data.

3. The portable printer according to claim 2, further comprising
   a template memory configured to store a first template having a first print object laid out in a predetermined manner with character strings assigned to said first print object, wherein the portable printer is configured to produce said first printed matter through cooperation of said feeder and said printing head by means of assigning certain character strings as said first print data to said first print object of said first template read from said template memory, and wherein said command transmission unit is configured to transmit, to the another printer when said another printer produces said second printed matter, said production instruction including said certain character strings as said second print data for assignment to a second print object of a second template having the second print object laid out in a predetermined manner with character strings assigned to said second print object.

4. The portable printer according to claim 1, further comprising
a command reception unit configured to input the production instruction of said first printed matter from an operation terminal through a first wireless communication with connection authentication, wherein
said command transmission unit is configured to output said production instruction for said second printed matter corresponding to said production instruction for said first printed matter through a second wireless communication using automatic recognition.

5. The portable printer according to claim 4, wherein
said command reception unit and said command transmission unit are made up of the same module.

6. The portable printer according to claim 1, wherein
said command transmission unit is configured to output said production instruction including image data of said first printed matter to said another printer.

7. The portable printer according to claim 1, wherein
said command transmission unit is configured to transmit said production instruction to said another printer at the time of completion of production of said first printed matter through the cooperation of said feeder and said printing head.

8. The portable printer according to claim 1, further comprising
an address memory configured to store address information of said another printer registered in advance, wherein
said command transmission unit is configured to transmit said production instruction to said another printer by using said address information stored in said address memory.

9. The portable printer according to claim 1, further comprising
a notification reception unit configured to receive from said another printer, after transmission of said production instruction to said another printer by said command transmission unit, a production failure notification of said second printed matter based on the production instruction.

10. The portable printer according to claim 9, further comprising
a production control unit configured to use the reception of said production failure notification by said notification reception unit as a trigger for controlling said feeder and said printing head by using second print data to produce said second printed matter.

* * * * *